(12) United States Patent
Oldenburg

(10) Patent No.: US 6,354,602 B1
(45) Date of Patent: Mar. 12, 2002

(54) ASSEMBLY VENT FOR BOOT/SEAL INSTALLATION

(75) Inventor: Thomas J. Oldenburg, Swartz Creek, MI (US)

(73) Assignee: American Axle & Manufacturing, Inc., Detroit, MI (US)

( * ) Notice: Subject to any disclaimer, the term of this patent is extended or adjusted under 35 U.S.C. 154(b) by 0 days.

(21) Appl. No.: 09/519,054

(22) Filed: Mar. 3, 2000

(51) Int. Cl.[7] .................................................. F16J 3/00
(52) U.S. Cl. ..................... 277/630; 277/634; 277/637; 277/928; 403/322.4; 403/373
(58) Field of Search ................... 277/630, 634, 277/637, 640, 315, 624, 620, 928; 464/173, 175; 403/373, 374.5, 321, 322.4, 326, 316, 317, 367, 134

(56) References Cited

U.S. PATENT DOCUMENTS

| | | | |
|---|---|---|---|
| 3,208,779 A | * | 9/1965 | Sullivan, Jr. |
| 3,441,298 A | * | 4/1969 | Herbenar et al. |
| 3,927,576 A | * | 12/1975 | Colletti ........................ 74/498 |
| 4,210,002 A | * | 7/1980 | Dore ........................... 64/32 F |
| 4,224,808 A | * | 9/1980 | Gehrke ........................ 64/32 F |
| 4,392,838 A | * | 7/1983 | Welschof et al. ........... 464/175 |
| 4,506,768 A | | 3/1985 | Innocent |
| 4,549,830 A | * | 10/1985 | Mette ......................... 403/134 |
| 4,556,400 A | * | 12/1985 | Krude et al. ................. 464/181 |
| 4,559,025 A | * | 12/1985 | Dore ............................ 464/175 |
| 4,671,586 A | | 6/1987 | DeBolt |
| 5,015,002 A | * | 5/1991 | Goodman et al. |
| RE33,701 E | | 9/1991 | Triquet |
| 5,261,678 A | | 11/1993 | Takemori et al. |

* cited by examiner

*Primary Examiner*—Anthony Knight
*Assistant Examiner*—Alison K. Pickard
(74) *Attorney, Agent, or Firm*—Harness, Dickey & Pierce, P.L.C.

(57) ABSTRACT

A tool for installing a boot seal assembly having a boot seal and a clamp structure. The boot seal is formed from a resilient elastomeric material and includes a sealing lip and an annular groove. The clamp structure is disposed in the annular groove and is positionable between an uncompressed state and a compressed state. Placement of the clamp structure in the compressed state causes a radially directed clamp force to be exerted onto the boot seal to bring the sealing lip into contact with a sealing surface of a structure to be sealed. The tool includes a clip structure coupled to at least one of the boot seal and the clamp structure. The clip structure includes an axially projecting portion that extends radially inward of and axially across the sealing lip. Contact between the axially projecting portion of the clip structure and the sealing surface of the structure to be sealed creates a vent which inhibits the build-up of fluid pressure within the boot seal when the seal assembly is installed to the structure to be sealed.

18 Claims, 3 Drawing Sheets

ASSEMBLY VENT FOR BOOT/SEAL INSTALLATION

BACKGROUND OF THE INVENTION

1. Technical Field

The present invention relates generally to the installation of boot seal assemblies and more particularly to a method for installing a boot seal which inhibits the build-up of fluid pressure within the boot seal during the installation of the boot seal.

2. Discussion

Boot seal assemblies for preventing ingress of foreign matter, such as dirt or water, into an end of a bore in a housing in which a piston is adapted to work. Boot seal assemblies are commonly used in hydraulic actuators and automotive drive-train components to prevent the ingress of foreign matter which could cause the piston to seize.

In known boot seal assemblies, a first seal is provided between a first portion of the seal assembly and a rigid clamping ring and a second seal is provided between a second portion of the seal assembly and the piston by stretching the second portion around the piston. Because of the first and second seals, it is frequently difficult to install boot seals as the first and second seals tend to trap fluid, such as air, within the boot seal. The trapped, pressurized fluid can substantially increase the force that required to seat the seal against the housing.

The trapped, pressurized fluid can also affect the depth with which the boot seal has been installed. Under some circumstances, trapped, pressurized fluid in the boot seal can cause the boot seal to creep off the housing, increasing the risk that foreign matter will come in contact with the piston and be drawn into the housing. Under other circumstances, trapped, pressurized fluid in the boot seal can be vented suddenly during the installation process, causing the boot seal to be installed at an improper depth.

SUMMARY OF THE INVENTION

It is one object of the present invention to provide a tool for installing a boot seal which prevents the build-up of pressurized fluid within the boot seal during its installation.

It is another object of the present invention to provide a tool for installing a boot seal which includes an axially projecting portion that creates a vent between the boot seal and the sealing surface of the member to be sealed.

It is a further object of the present invention to provide a seal assembly having a boot seal and a tool for venting the boot seal during installation of the seal assembly.

It is another object of the present invention to provide a method for installing a boot seal which prevents the build-up of pressurized fluid within the boot seal during its installation.

The present invention is directed to a tool for installing a boot seal assembly having a boot seal and a clamp structure. The boot seal is formed from a resilient elastomeric material and includes a sealing lip and an annular groove. The clamp structure is disposed in the annular groove and is positionable between an uncompressed state and a compressed state. Placement of the clamp structure in the compressed state causes a radially directed clamp force to be exerted onto the boot seal to bring the sealing lip into contact with a sealing surface of a structure to be sealed. The tool includes a clip structure coupled to at least one of the boot seal and the clamp structure. The clip structure includes an axially projecting portion that extends radially inward of and axially across the sealing lip. Contact between the axially projecting portion of the clip structure and the sealing surface of the structure to be sealed creates a vent which inhibits the build-up of fluid pressure within the boot seal when the seal assembly is installed to the structure to be sealed.

Additional advantages and features of the present invention will become apparent from the subsequent description and the appended claims, taken in conjunction with the accompanying drawings.

DETAILED DESCRIPTION OF THE PREFERRED EMBODIMENT

Figure 1:
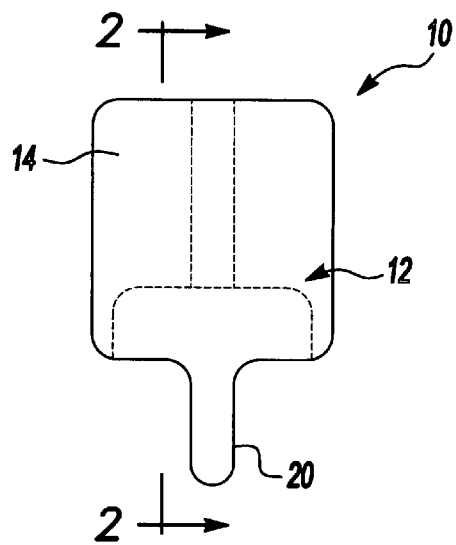
FIG. 1 is a front view of a tool constructed in accordance with a first embodiment of the teachings of the present invention.
Figure 2:
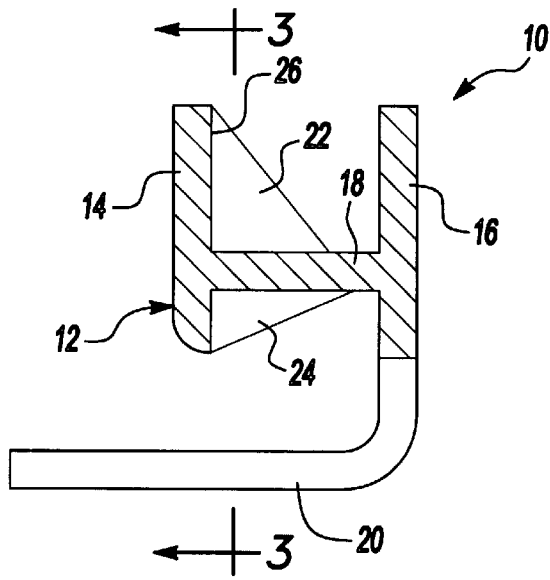
FIG. 2 is a cross-sectional view of the tool of FIG. 1 taken along the line 2—2 in FIG. 1.
Figure 3:
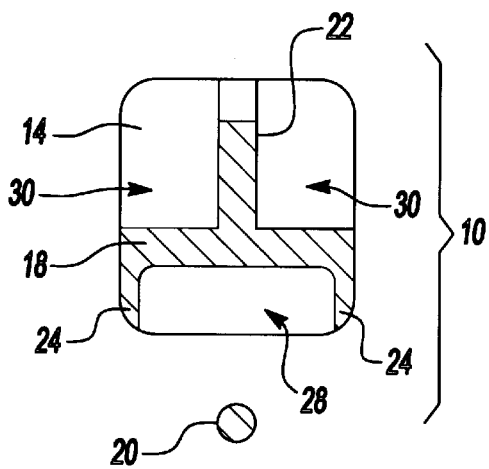
FIG. 3 is a cross-sectional view of the tool of FIG. 1 taken along the line 3—3 in FIG. 2.
Figure 4:
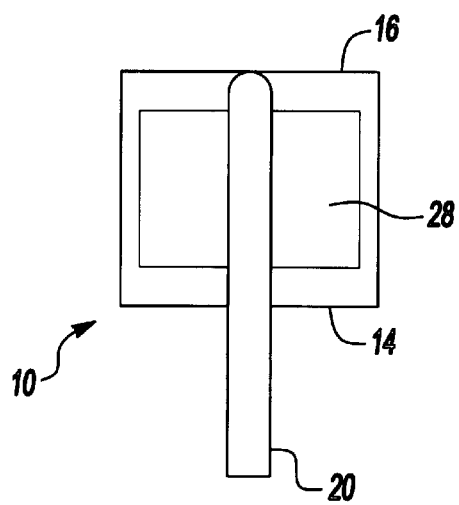
FIG. 4 is a bottom view of the tool of FIG. 1.

In FIGS. 1 through 4 a tool constructed in accordance with the teachings of the present invention is generally indicated by reference numeral 10. Tool 10 is preferably unitarily formed from plastic or a similar material so as not to damage the seals with which tool 10 comes into contact. In the embodiment illustrated, tool 10 is shown to be a clip structure 12 having first and second vertically projecting members 14 and 16, respectively, an axial body portion 18, an axially projecting portion 20, an upper gusset 22 and a pair of lower gussets 24.

Axial body portion 18 is coupled to first vertically projecting member 14 at a first end and to second vertically projecting member 16 at a second end. Upper and lower gussets 22 and 24 couple the sides of axial body portion 18 to the vertically projecting inner face 26 of first vertically projecting member 14 and thereby stiffen the connection between axial body portion 18 and first vertically projecting member 14.

Axially projecting portion 20 is coupled to second vertically projecting member 16 and extends rearward therefrom. Axially projecting portion 20 is generally cylindrical in shape with a generally circular cross-section. Alternatively, axially projecting portion 20 may be flattened somewhat to minimize its height. Also alternatively, the surface portion of axially projecting portion 20 that is adapted to contact the member to be sealed may be contoured to match the surface of the member to be sealed so as to further reduce the effort with which a seal is installed.

First and second vertically projecting members 14 and 16, the pair of lower gussets 24 and axial body portion 18 cooperate to form a crimp cavity 28 which will be discussed in greater detail, below. First and second vertically projecting members 14 and 16, upper gusset 22 and axial body portion 18 cooperate to form a pair of laterally spaced finger pockets 30 which will be discussed in greater detail, below.

Figure 5:
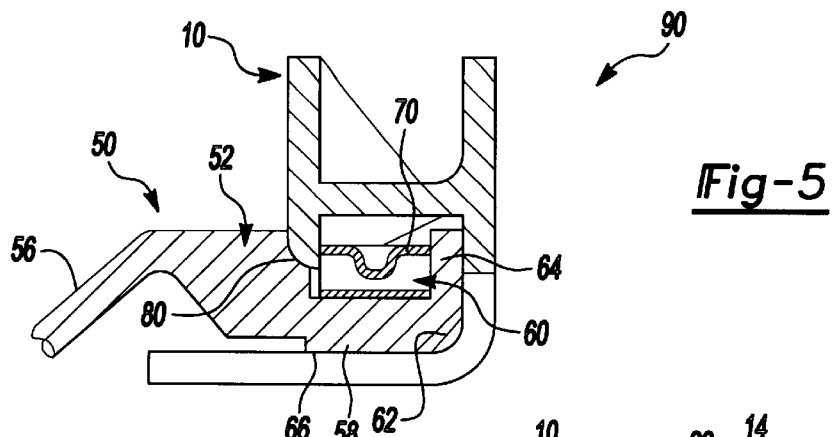
FIG. 5 is a view similar to FIG. 2 but illustrating the tool coupled to a boot seal assembly.
Figure 6:
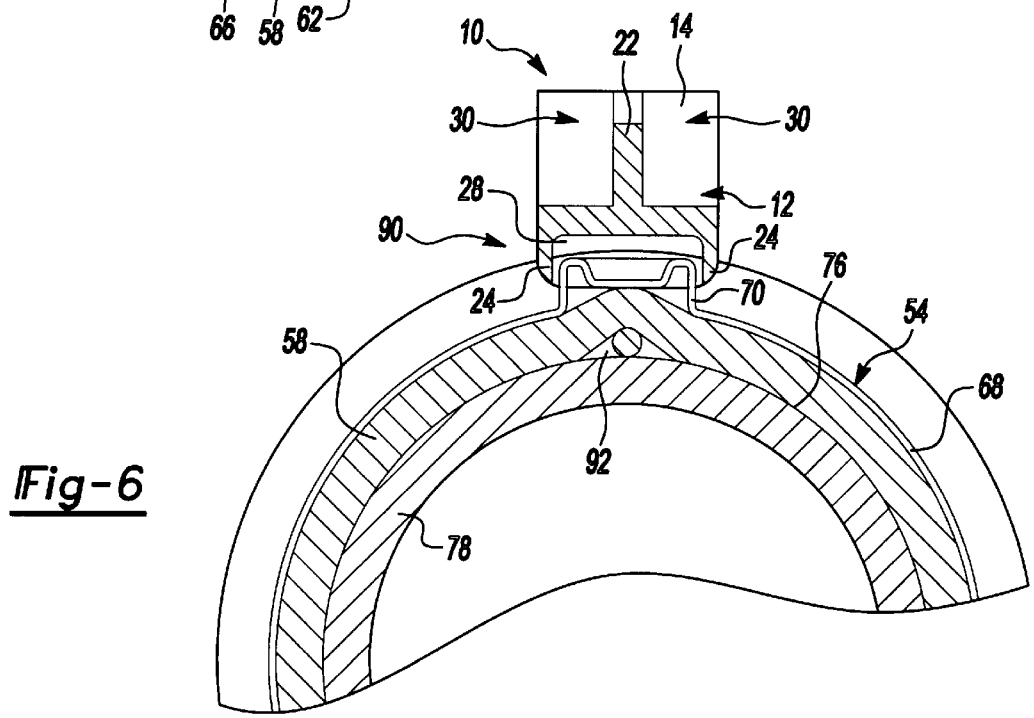
FIG. 6 is a view similar to FIG. 3 but illustrating the tool in operative association with a boot seal assembly and a housing.

In FIGS. 5 and 6 tool 10 is illustrated in operative association with a boot seal assembly 50. Boot seal assembly 50 is shown to include a boot seal 52 and a clamp structure 54. Boot seal 52 is conventional in construction and is formed from an elastomeric material. Boot seal 52 includes a wall member 56, an annular sealing lip 58 and an annular clamp groove 60. Annular sealing lip 58 includes a chamfer 62 which breaks the sharp edge that would otherwise be formed by the intersection of the front face 64 and the inner face 66 of sealing lip 58. Annular clamp groove 60 is disposed within boot seal 52 behind chamfer 62 and is sized to receive clamp structure 54.

In the embodiment illustrated, clamp structure 54 is a band-type clamp that includes a band portion 68 and a crimp portion 70. Clamp structure 54 is disposed in annular clamp groove 60 and positionable between an uncompressed state and a compressed state. Placement of clamp structure 54 in the compressed state causes a radially directed clamp force to be exerted onto boot seal 52 to bring sealing lip 58 into contact with a sealing surface 76 of a structure to be sealed, such as a housing 78.

Tool 10 is initially coupled to boot seal assembly 50 such that axially projecting portion 20 is in contact with the inner face 66 of sealing lip 58, the crimp portion 70 of clamp structure 54 is disposed within crimp cavity 28 and first vertically projecting member 14 is coupled to crimp portion 70. Preferably, boot seal 52 includes an annular groove 80 which intersects annular clamp groove 60. Annular groove 80 is sized to receive and permits sealing lip 58 to exert a forwardly directed force onto first vertically projecting member 14. As crimp cavity 28 is sized to receive both crimp portion 70 and the front face 64 of boot seal 52, the forwardly directed force exerted by sealing lip 58 against first vertically projecting member 14 is countered by the front face 64 of boot seal 52. This counterbalancing of forces tends to retain tool 10 to boot seal assembly 50. Axially projecting portion 20 extends axially across the inner face 66 of boot seal 52 to prevent tool 10 from lifting off seal assembly.

In operation, tool 10 can be preinstalled to boot seal assembly 50 to form a seal assembly 90. Seal assembly 90 is then coupled to housing 78 such that sealing lip 58 is in contact with substantially all of the sealing surface 76. Axially projecting portion 20 is also in contact with sealing surface 76 and as such, prevents sealing lip 58 from completely engaging sealing surface 76. During the installation of seal assembly 90 to housing 78, axially projecting portion 20 remains in contact with sealing surface 76. The portion of sealing lip 58 proximate axially projecting portion 20 rises above sealing surface 76 and forms a vent 92 which is operable for inhibiting the build-up of fluid pressure within boot seal 52 when seal assembly 90 is installed to housing 78.

Once boot seal 52 has been installed to a desired depth, tool 10 may be withdrawn from boot seal assembly 50. Finger pockets 30 in the lateral sides of tool 10 are adapted to receive the fingers and/or thumb of a technician to permit tool 10 to be pulled from boot seal assembly 50. Tool 10 may thereafter be saved for re-use or may be disposed of.

Figure 7:
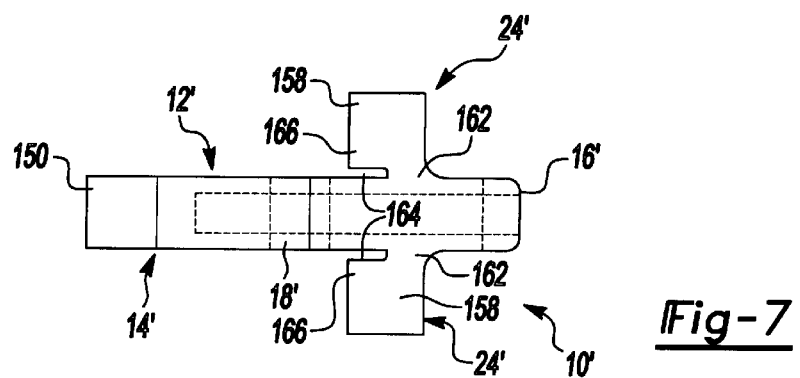
FIG. 7 is a top view of a tool constructed in accordance with a second embodiment of the present invention.
Figure 8:
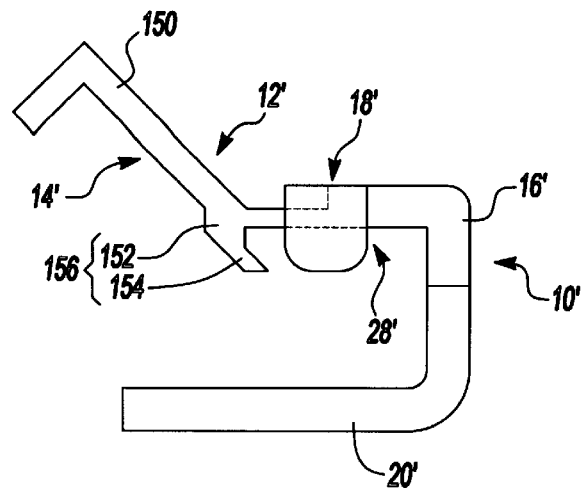
FIG. 8 is a side view of the tool of FIG. 7.
Figure 9:
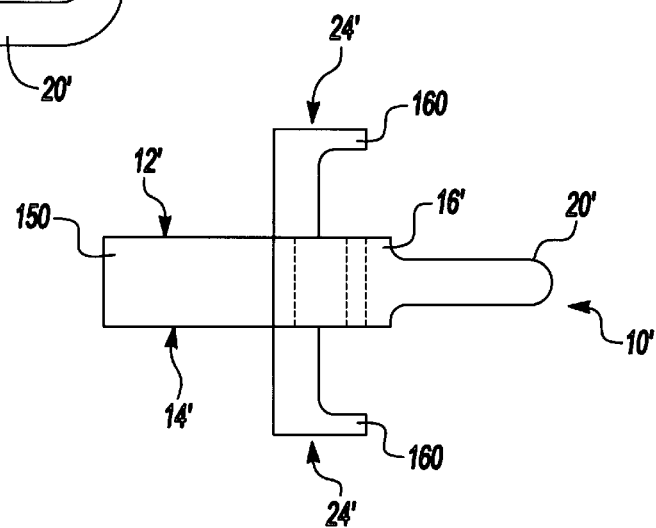
FIG. 9 is an end view of the tool of FIG. 7.

While tool 10 been described thus far according to a particular embodiment, those skilled in the art will appreciate that the invention, in its broader aspects, may be constructed somewhat differently. For example, the tool may be constructed as shown in FIGS. 7 through 9. In this arrangement, tool 10' is shown to include a clip structure 12' having first and second vertically projecting members 14' and 16', respectively, an axial body portion 18', an axially projecting portion 20' and a pair of lateral members 24'.

Axial body portion 18' is coupled to first vertically projecting member 14' at a first end and to second vertically projecting member 16' at a second end. A first portion 150 of first vertically projecting member 14' depends in an upward and rearward direction away from axial body portion 18'. A second portion 152 of first vertically projecting member 14' depends in a downward direction generally perpendicular to axial body portion 18'. A third portion 154 of first vertically projecting member 14' depends in a downward and forward direction relative to axial body portion 18'. The second and third portions 152 and 154 of first vertically projecting member 14' cooperate to form a hook structure 156, the purpose of which will be described in detail, below.

Each lateral member 24' includes a laterally projecting portion 158 and a vertically projecting portion 160. The forward edge 162 of each of the laterally projecting portions 158 are coupled to an opposite lateral side of axial body portion 18'. Coupling the lateral members 24' to the axial body portion 18' in this manner produces a U-shaped groove 164 between the axial body portion 18' and the rearward edge 166 of the laterally projecting portions 158. First and second vertically projecting members 14' and 16' and the pair of lateral members 24' cooperate to form a crimp cavity 28' having the same purpose and function as crimp cavity 28, discussed above.

Axially projecting portion 20' is coupled to second vertically projecting member 16' and extends rewardly therefrom. Axially projecting portion 20' is generally cylindrical in shape with a generally circular cross-section, but may also be flattened or curved as discussed above.

Figure 10:
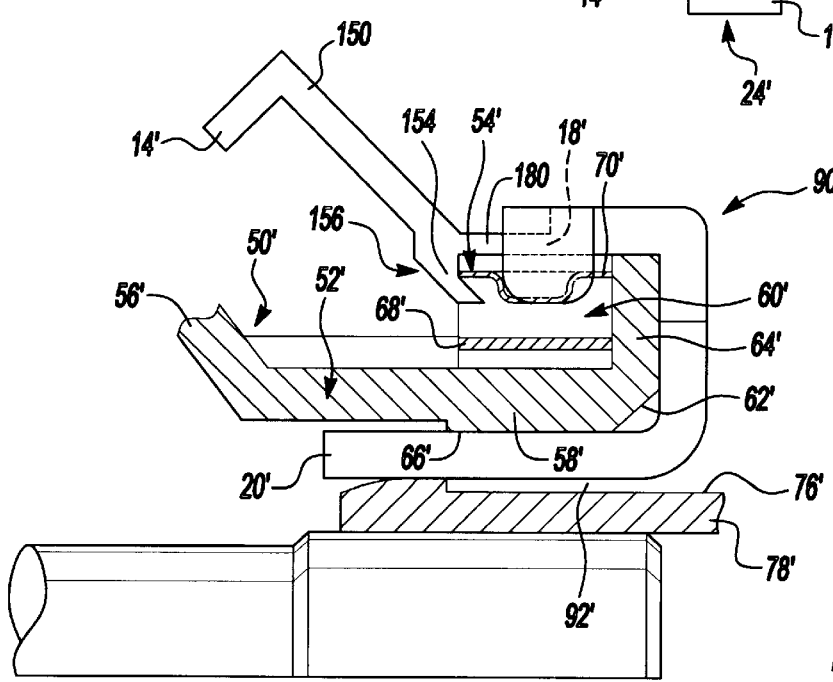
FIG. 10 is a view of the tool of FIG. 7 in operative association with a boot seal assembly and a transfer case output shaft.

In FIG. 10, tool 10' is illustrated in operative association with a boot seal assembly 50'. Boot seal assembly 50' is shown to include a boot seal 52' and a clamp structure 54'. Boot seal 52' is largely conventional in construction, being formed from an elastomeric material and having a wall member 56', an annular sealing lip 58' and an annular clamp groove 60'.

Annular sealing lip 58' includes a chamfer 62' which breaks the sharp edge that would otherwise be formed by the intersection of the front face 64' and the inner face 66' of sealing lip 58'. Annular clamp groove 60' is disposed within boot seal 52' behind chamfer 62' and is sized to receive clamp structure 54'.

In the embodiment illustrated, clamp structure 54' is a band-type clamp that includes a band portion 68' and a crimp portion 70'. Clamp structure 54' is disposed in annular clamp groove 60' and positionable between an uncompressed state and a compressed state. Placement of clamp structure 54' in the compressed state causes a radially directed clamp force to be exerted onto boot seal 52' to bring sealing lip 58' into contact with a sealing surface 76' of a structure to be sealed, such as a transfer case output shaft 78'.

Tool 10' is initially coupled to boot seal assembly 50' such that axially projecting portion 20' is in contact with the inner face 66' of sealing lip 58', the crimp portion 70' of clamp structure 54' is disposed within crimp cavity 28' and a hook structure 156 is coupled to crimp portion 70'. In coupling hook structure 156 to crimp portion 70', the third portion 154 of first vertically projecting member 14' hooks under crimp portion 70'. Hook structure 156 is configured to exert a forwardly directed force through clamp structure 54'. As crimp cavity 28' is sized to receive both crimp portion 70' and the front face 64' of boot seal 52', the forwardly directed force exerted by hook structure 156 is countered by the resiliency of the front face 64' of boot seal 52'. This counterbalancing of forces tends to retain tool 10' to boot seal assembly 50'. Axially projecting portion 20' extends axially across the inner face 66' of boot seal 52' to prevent tool 10' from lifting off seal assembly.

In operation, tool 10' can be preinstalled to boot seal assembly 50' to form a seal assembly 90'. Seal assembly 90' is then coupled to transfer case output shaft 78' such that sealing lip 58' is in contact with substantially all of the sealing surface 76'. Axially projecting portion 20' is also in contact with sealing surface 76' and as such, prevents sealing lip 58' from completely engaging sealing surface 76'. During the installation of seal assembly 90' to transfer case output shaft 78', axially projecting portion 20' remains in contact with sealing surface 76'. The portion of sealing lip 58' proximate axially projecting portion 20' rises above sealing surface 76' and forms a vent 92' which is operable for inhibiting the build-up of fluid pressure within boot seal 52' when seal assembly 90' is installed to transfer case output shaft 78'.

Once boot seal 52' has been installed to a desired depth, tool 10' may be withdrawn from boot seal assembly 50'. An upwardly and forwardly directed force may be applied to the first portion 150 of first vertically projecting member 14' to create a levering effect which causes hook structure 156 to disengage crimp portion 70'. The U-shaped slots 164 and the necked-down portion 180 of axial body portion 18' cooperate to provide first vertically projecting member 14' with a desired degree of flexibility. Tool 10' may then be pulled from boot seal 50' and saved for re-use or disposed of.

While the invention has been described in the specification and illustrated in the drawings with reference to a preferred embodiment, it will be understood by those skilled in the art that various changes may be made and equivalents may be substituted for elements thereof without departing from the scope of the invention as defined in the claims. In addition, many modifications may be made to adapt a particular situation or material to the teachings of the invention without departing from the essential scope thereof. Therefore, it is intended that the invention not be limited to the particular embodiment illustrated by the drawings and described in the specification as the best mode presently contemplated for carrying out this invention, but that the invention will include any embodiments falling within the description of the appended claims.

I claim:

1. A seal assembly comprising:
    a boot seal formed from a resilient elastomeric material, the boot seal including a sealing lip and an annular groove;
    a clamp structure disposed in the annular groove and positionable between an uncompressed state and a compressed state, wherein placement of the clamp structure in the compressed state is adapted to exert a radially directed clamp force to onto the boot seal to bring the sealing lip into contact with a sealing surface of a structure to be sealed; and
    a discrete clip structure coupled to at least one of the boot seal and the clamp structure, the clip structure including an axially projecting portion that extends radially inward of and axially across the sealing lip; wherein contact between the axially projecting portion of the clip structure and the sealing surface of the structure to be sealed is adapted to create a vent which inhibits a buildup of fluid pressure within the boot seal when the seal assembly is installed to the structure to be sealed, the clip structure thereafter being removed from engagement with the boot seal after the boot seal has been installed to permit the seal lip to sealingly engage the sealing surface.

2. The seal assembly of claim 1, wherein the clip structure includes a pair of spaced apart vertically projecting members, a first one of the vertically projecting members engaging the clamp structure to retain the clip structure thereto.

3. The seal assembly of claim 2, wherein the axially projecting portion is coupled to a second one of the vertically projecting members.

4. The seal assembly of claim 2, wherein the first one of the vertically projecting members includes a hook structure for engaging a crimp portion of the clamp structure.

5. The seal assembly of claim 4, wherein the first one of the vertically projecting members further includes a levering member for applying a levering force to the hook structure to cause the hook structure to disengage the crimp portion of the clamp structure.

6. The seal assembly of claim 1, wherein the clip structure includes a pair of finger pockets configured to facilitate the withdrawal of the clip structure from the boot seal.

7. The seal assembly of claim 1, wherein the axially projecting portion is a cylindrical post.

8. The seal assembly of claim 1, wherein the clip structure is formed from plastic.

9. A tool for installing a boot seal assembly having a boot seal and a clamp structure, the boot seal formed from a resilient elastomeric material, the boot seal including a sealing lip and an annular groove, the clamp structure disposed in the annular groove and positionable between an uncompressed state and a compressed state, wherein placement of the clamp structure in the compressed state is exerts a radially directed clamp force to onto the boot seal to bring the sealing lip into contact with a sealing surface of a structure to be sealed, the tool comprising:
    a clip structure having an axially projecting portion, the clip structure adapted to be coupled to the boot seal assembly such that the axially projecting portion extends radially inward of and axially across the sealing lip to create a vent which inhibits a build-up of fluid pressure within the boot seal when the boot seal assembly is installed to the structure to be sealed, the clip structure being removed from engagement with the boot seal after the boot seal has been installed to the sealing surface to permit the seal lip to sealingly engage the sealing surface.

10. The tool of claim 9, wherein the clip structure includes a pair of spaced apart vertically projecting members, a first one of the vertically projecting members engaging the clamp structure to retain the clip structure thereto.

11. The tool of claim 10, wherein the axially projecting portion is coupled to a second one of the vertically projecting members.

12. The tool of claim 10, wherein the first one of the vertically projecting members includes a hook structure for engaging a crimp portion of the clamp structure.

13. The tool of claim 12, wherein the first one of the vertically projecting members further includes a levering member for applying a levering force to the hook structure to cause the hook structure to disengage the crimp portion of the clamp structure.

14. The tool of claim 9, wherein the clip structure includes a pair of finger pockets adapted to facilitate the withdrawal of the clip structure from the boot seal.

15. The tool of claim 9, wherein the axially projecting portion is a cylindrical post.

16. The tool of claim 9, wherein the clip structure is formed from plastic.

17. A method for installing a boot seal assembly comprising the steps of:

provinding a boot seal assembly having a boot seal and a clamp structure the boot seal formed from a resilient elastomeric material, the boot seal including a sealing lip and an annular groove, the clamp structure disposed in the annular groove and positionable between an uncompressed state and a compressed state;

providing a tool for venting the boot seal;

simultaneously installing the boot seal assembly to a structure to be sealed and venting the boot seal assembly to inhibit a build-up of fluid pressure within the boot seal; and disengaging the tool from the boot seal to permit the boot seal to sealingly engage the structure to be sealed.

18. The method of claim 17, wherein the tool for venting the boot seal is a clip structure having an axially projecting portion, the clip structure coupled to the boot seal assembly such that the axially projecting portion extends radially inward of and axially across the sealing lip.

* * * * *

UNITED STATES PATENT AND TRADEMARK OFFICE
CERTIFICATE OF CORRECTION

PATENT NO. : 6,354,602 B1  
DATED : March 12, 2002  
INVENTOR(S) : Thomas J. Oldenburg It is certified that error appears in the above-identified patent and that said Letters Patent is hereby corrected as shown below:

Column 1,  
Line 27, after "that" insert -- is --

Column 3,  
Line 66, after "10" insert -- has --

Column 4,  
Line 35, "rewardly" should be -- rearwardly --

Column 5,  
Line 61, after "force", delete "to".

Column 6,  
Line 38, after "state", delete "is"  
Line 39, after "force", delete "to".

Signed and Sealed this

Nineteenth Day of August, 2003

JAMES E. ROGAN  
*Director of the United States Patent and Trademark Office*